(12) United States Patent
Lu et al.

(10) Patent No.: US 7,506,408 B2
(45) Date of Patent: Mar. 24, 2009

(54) HINGE WITH A LIMITATION FUNCTION

(75) Inventors: Sheng-Nan Lu, Shulin (TW); Chia-Ko Chung, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 352 days.

(21) Appl. No.: 11/382,673

(22) Filed: May 10, 2006

(65) Prior Publication Data

US 2007/0261205 A1  Nov. 15, 2007

(51) Int. Cl.
*E05D 11/08* (2006.01)

(52) U.S. Cl. .......................... 16/340; 16/337

(58) Field of Classification Search ................ 16/340, 16/228, 337, 330, 303, 386, 374, 377; 361/680–683; 248/919–923; 455/90.3, 550.1, 575.8, 575.4, 455/575.1, 575.3
See application file for complete search history.

(56) References Cited

U.S. PATENT DOCUMENTS

| | | | | | |
|---|---|---|---|---|---|
| 5,077,551 A | * | 12/1991 | Saitou | .................... | 345/207 |
| 6,018,847 A | * | 2/2000 | Lu | .................... | 16/337 |
| 6,108,868 A | * | 8/2000 | Lin | .................... | 16/340 |
| 6,163,928 A | * | 12/2000 | Chung | .................... | 16/342 |
| 6,286,187 B1 | * | 9/2001 | Chang | .................... | 16/340 |
| 6,421,878 B1 | * | 7/2002 | Kaneko et al. | .................... | 16/330 |
| 6,665,907 B1 | * | 12/2003 | Lu | .................... | 16/340 |
| 6,804,861 B2 | * | 10/2004 | Hsu | .................... | 16/366 |
| 6,862,779 B1 | * | 3/2005 | Lu et al. | .................... | 16/340 |
| 2003/0097732 A1 | * | 5/2003 | Kim | .................... | 16/337 |

* cited by examiner

*Primary Examiner*—Chuck Y. Mah
(74) *Attorney, Agent, or Firm*—patenttm.us

(57) ABSTRACT

A hinge with a limitation function has a shaft, which is mounted with a stationary seat, a male segment, a resilient member, a washer and a rotatable seat, and engages a nut to fasten the above elements. When the movable display panel rotates in relative to the main unit, the movable display panel rotates the rotatable seat, and the rotatable seat further rotates the shaft. The male segment also rotates in relative to the female segment; meanwhile, the head is rotate along the fastening portion. When the lugs are engaged in the notches respectively, the display panel is positioned at a certain position, the plane face is against the fastening portion so that the shaft cannot rotate continuously to the same direction.

4 Claims, 4 Drawing Sheets

HINGE WITH A LIMITATION FUNCTION

BACKGROUND OF THE INVENTION

1. Field of the Invention

The present invention relates to a hinge for a portable electronic device, and more particularly to a hinge with a limitation function.

2. Description of the Related Art

Nowadays portable electronic devices such as notebook computers, personal translators, personal digital assistants (PDA) are well received by consumers. The above electronic devices normally comprise a display panel and a main unit. The display panel is coupled to the main unit by means of a hinge, so the user only has to pivot the display panel in relative to the hinge to operate or to close the devices. The conventional hinge has a male segment and a female segment oppositely mounted. The female segment has a detent, and the male segment has a protruding portion that engages the detent. If the user pivot the display panel excessively, the female segment and the male segment will be separated, which tends to damage the display panel.

Therefore, the invention provides an improved hinge with limitation function to mitigate or obviate the aforementioned problems.

SUMMARY OF THE INVENTION

The main objective of the present invention is to provide a hinge with a limitation function, which comprises:

a stub extends from a first end of the shaft, a head extends from a second end of the shaft, the head has a first cambered surface and a second cambered surface, and a plane face is formed between the first cambered surface and the second cambered surface;

a stationary seat is formed of an "L" shaped and composed of a fastening portion and a female segment, the female segment is mounted on the shaft, one side of the female segment away from the fastening portion has at least one notch defined therein, and each notch has first inclined ends formed thereon;

a male segment is sleeved on the shaft adjacent to the female shaft, one side of the male segment facing the female segment having at least one lug formed there on corresponding to the notch, and each lug has second inclined ends formed thereon;

a rotatable seat is mounted on the shaft;
a resilient member is mounted on the shaft;
a washer is mounted on the shaft; and
a nut engages the stub of the shaft.

When the movable display panel rotates in relative to the main unit, the movable display panel rotates the rotatable seat, and the rotatable seat further rotates the shaft. The male segment also rotates in relative to the female segment; meanwhile, the head rotates along the fastening portion. When the lugs engages the notches respectively, the display panel is positioned at a certain position; the plane face is against the fastening portion so that the shaft cannot rotate continuously to the same direction.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
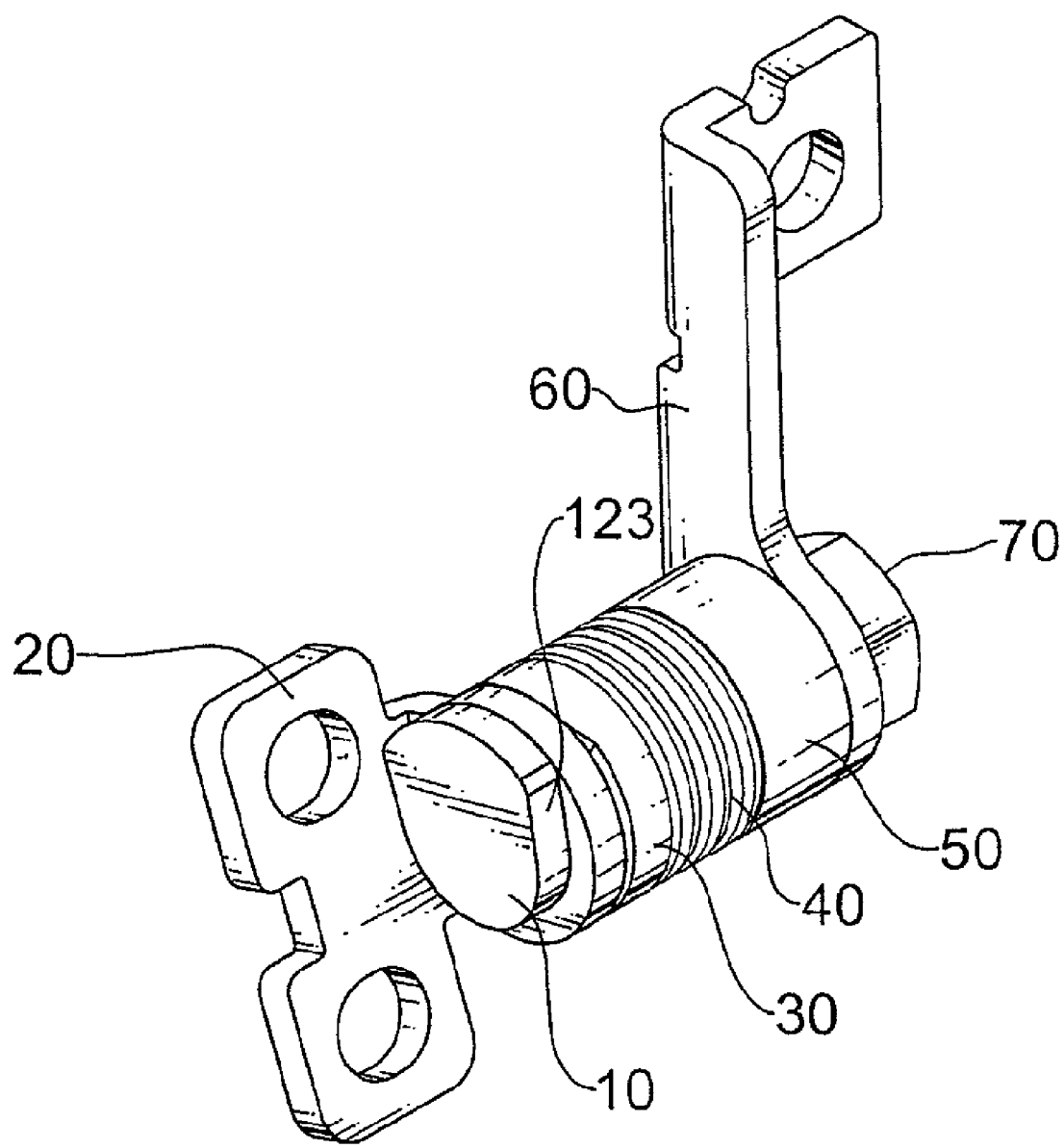
FIG. 1 is a perspective view of the hinge in accordance with this invention.
Figure 2:
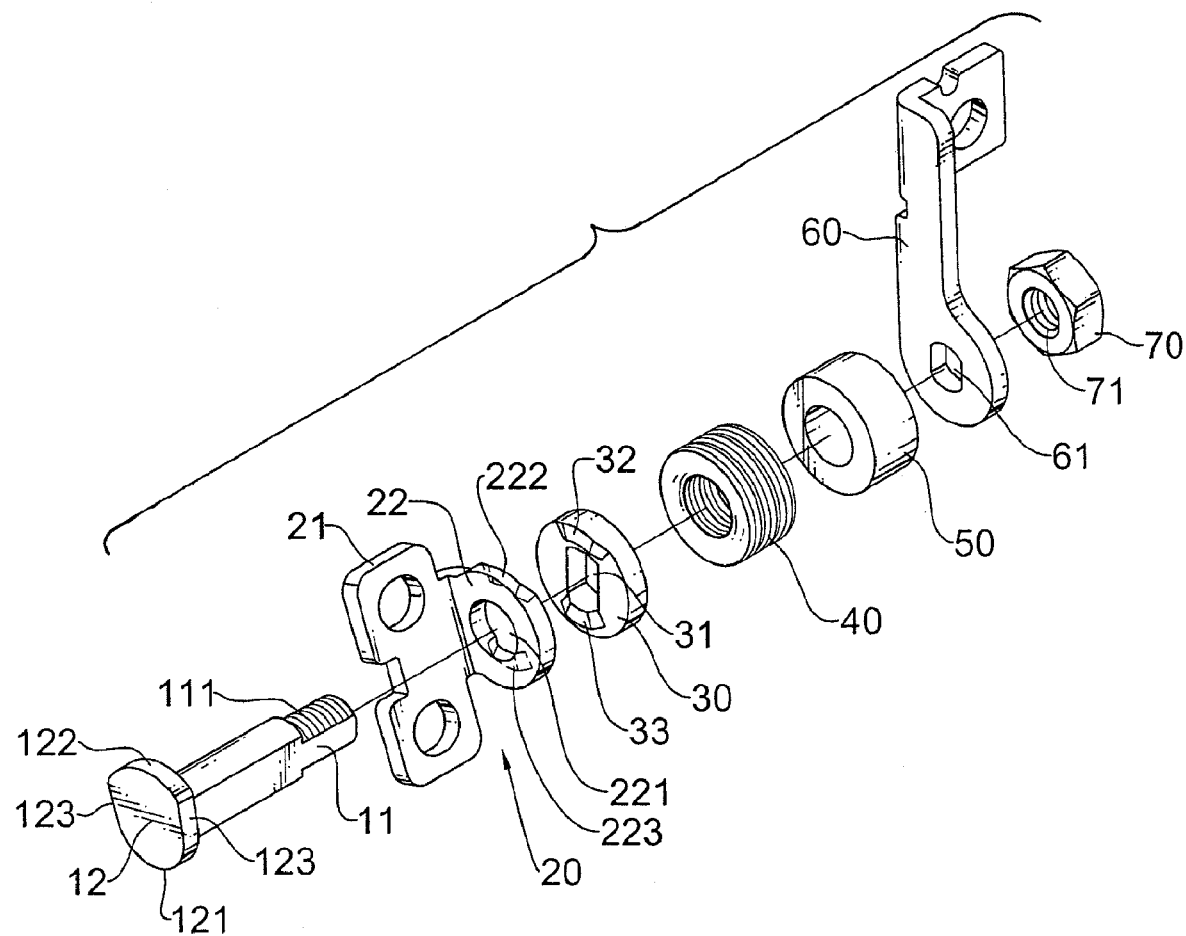
FIG. 2 is an exploded view of the hinge in accordance with this invention.

With reference to FIGS. 1-2, the hinge has a shaft (10), a stationary seat (20), a male segment (30), a resilient member (40), a washer (50), a rotatable seat (60) and a nut (70).

The shaft (10) may be non-circular, and has a first end, a second end, a stub (11) extends from the first end of the shaft (10) with an optional thread (111) defined thereon, a head (12) extends from the second end of the shaft (10). The head (12) has a first cambered surface (121) and a second cambered surface (122), and a plane face (123) is formed between the first cambered surface (121) and the second cambered surface (122).

The stationary seat (20) is "L" shaped and comprises a fastening portion (21) and a female segment (22). The female segment (22) may have a hole (221) defined in the middle, and the female segment (22) is mounted around the shaft (10) by means of the hole (221). One side of the female segment (22) away from the fastening portion (21) has two notches (222), (223) defined therein, and each notch (222), (223) has inclined ends formed thereon.

The male segment (30) may have a first non-circular hole (31) defined in the middle, and the male segment (30) is mounted on the shaft (10) by means of the non-circular hole adjacent to the female segment. In addition, one side of the male segment (30) faced with the female segment (22) has two lugs (32), (33) formed thereon and corresponding to the two notches (222), (223), and each lug (32), (33) has inclined ends formed thereon.

The rotatable seat (60) may have a second non-circular hole (61), and the rotatable seat (60) is mounted on the shaft (10) by means of the second non-circular hole (61).

The resilient member (40) and the washer (50) may both have a through hole defined in the middle, and the resilient member (40) and the washer (50) are mounted on the shaft (10) by means of the through holes, between the male segment (30) and the rotatable seat (60). The nut (70) may have inner threads defined therein and engages the stub (11) besides the rotatable seat (60), whereby the stationary seat (20), the male segment (30), the resilient member (40), the washer (50), and the rotatable seat (60) are fastened firmly.

Figure 3:
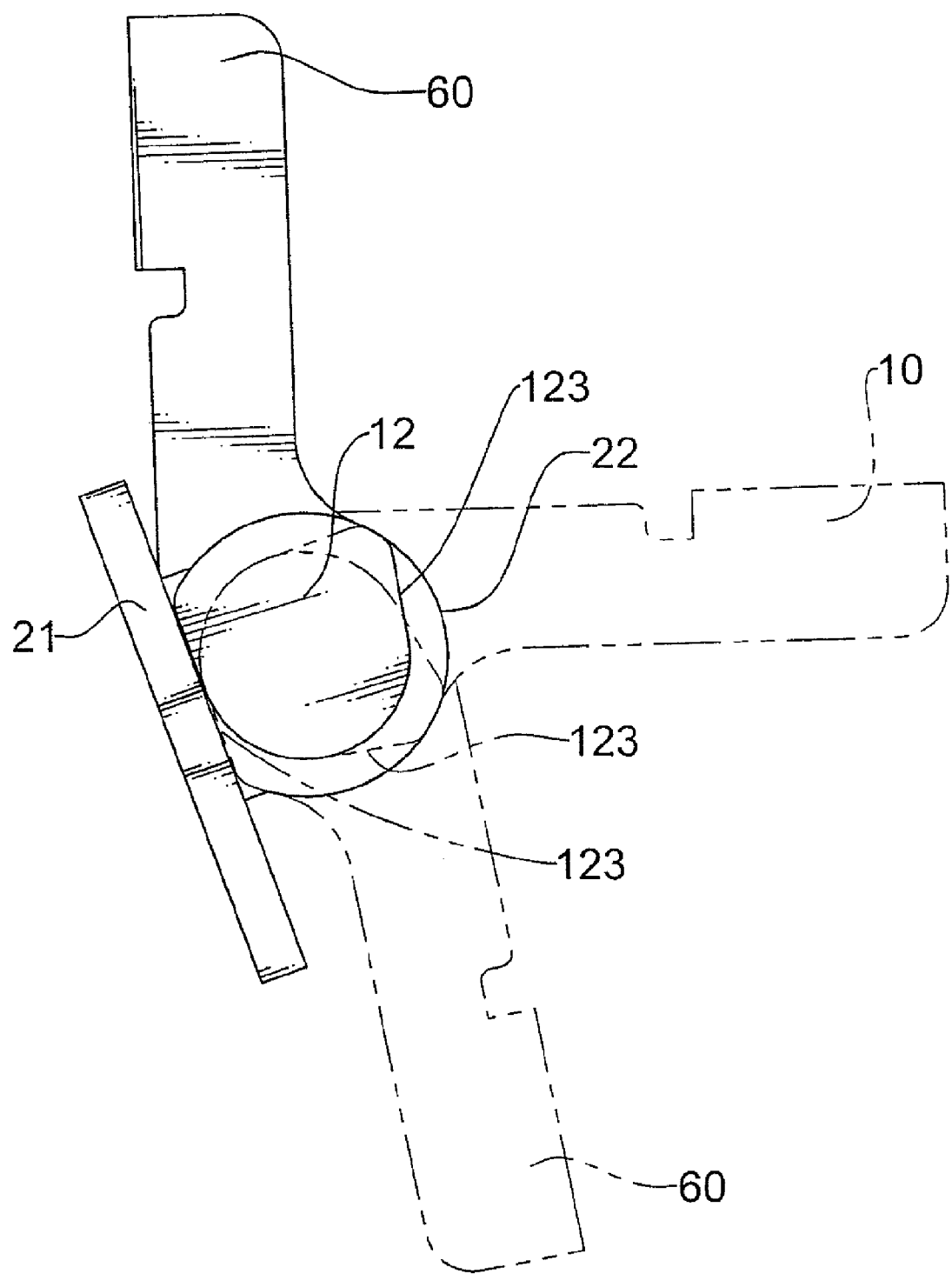
FIG. 3 is a front view of the hinge in accordance with this invention.
Figure 4:
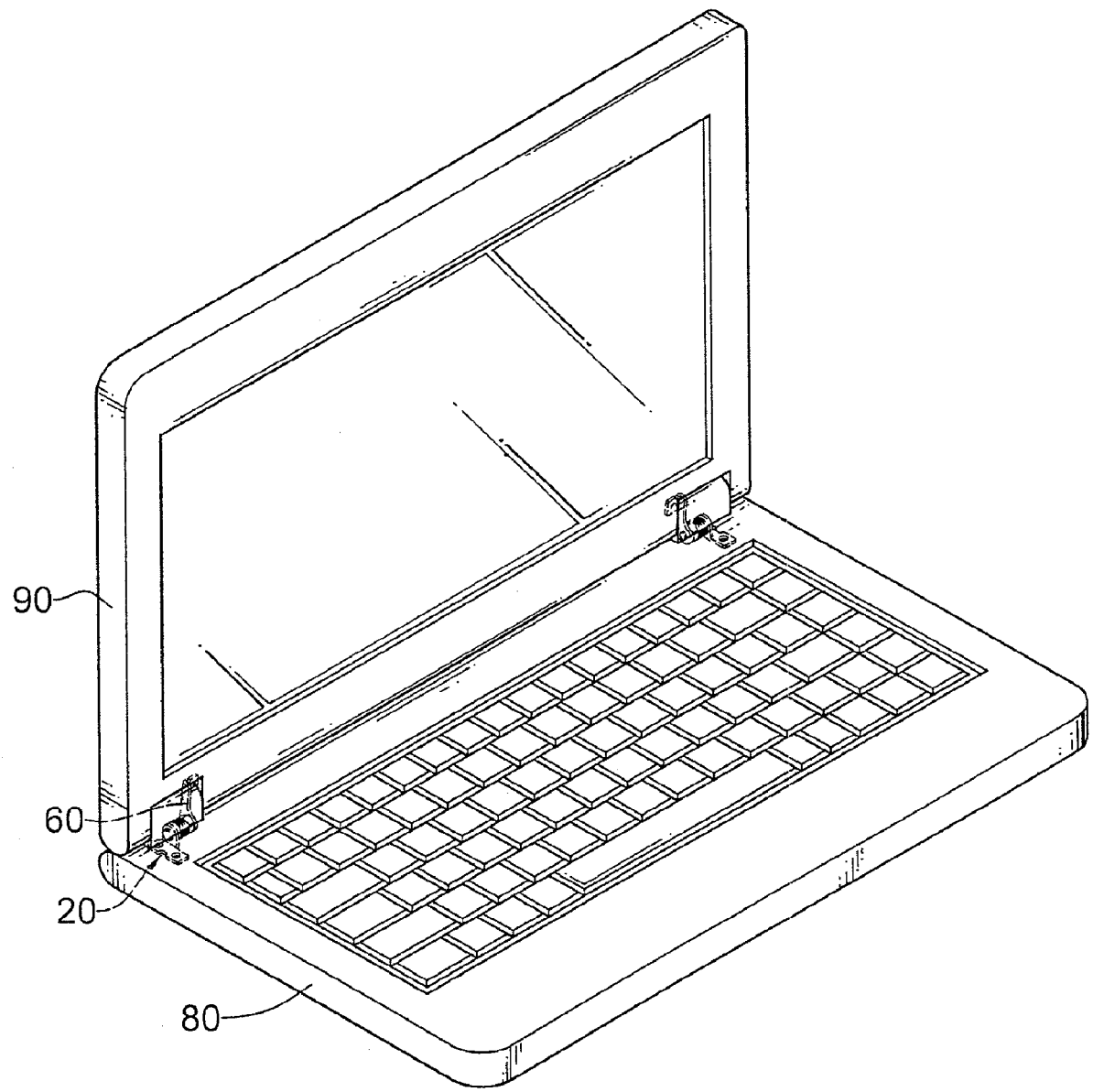
FIG. 4 is the hinge of this invention applied on a personal translator.

With reference to FIGS. 2-4, the hinge of this invention is mounted on a personal translator, between a movable display panel (90) and a main unit (80). The fastening portion (21) of the stationary seat (20) is mounted with the main unit (80) and the rotatable seat (60) is mounted with the movable display panel (90). When the movable display panel (90) rotates in relative to the main unit (80), the movable display panel (90) rotates the rotatable seat (60), and the rotatable seat (60) further rotates the shaft (10). The male segment (30) also rotates in relative to the female segment (22); meanwhile, the head (12) rotates along the fastening portion (21). When the lugs (32) engages the notches (222), (223) respectively, the display panel is positioned at a certain position, the plane face (123) is against the fastening portion (21) so that the shaft (10) can not rotate continuously to the same direction.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge with a limitation function comprising:

a stub extending from a first end of a shaft, a head extending from a second end of the shaft, the head having a first cambered surface and a second cambered surface, and a plane face formed between the first cambered surface and the second cambered surface;

a stationary seat being "L" shaped and comprising a fastening portion and a female segment, the female segment mounted rotatably around the shaft and one side of the female segment, away from the fastening portion, having at least one notch defined therein, and the at least one notch having inclined ends formed on the notch;

a male segment mounted securely around the shaft adjacent to the female shaft, one side of the male segment facing the female segment having at least one lug formed on the male segment and corresponding respectively to the at least one notch, and the at least one lug having inclined ends formed on the lug;

a rotatable seat mounted securely around the shaft;

a resilient member mounted rotatably around the shaft;

a washer mounted rotatably around the shaft; and a nut engaging the stub of the shaft.

2. The hinge with limitation function as claimed in claim 1, wherein the shaft has a non-circular section, the female segment has a hole defined in the middle, and the female segment is mounted on the shaft with the hole, the male segment has a first non-circular hole defined in the middle, and the male segment is mounted on the shaft with the non-circular hole adjacent to the female segment, the rotatable seat has a second non-circular hole, and the rotatable seat is mounted on the shaft with the second non-circular hole.

3. The hinge with limitation function as claimed in claim 1, wherein the stub has threads defined on the stub, and the nut has inner threads defined in the nut and engaging with the threads on the stub.

4. The hinge with limitation function as claimed in claim 3, wherein the resilient member and the washer are mounted between the male segment and the rotatable seat.

* * * * *